US009695910B2

United States Patent
Komiya

(10) Patent No.: US 9,695,910 B2
(45) Date of Patent: Jul. 4, 2017

(54) DEVICE FOR GUIDING LONG OBJECT

(71) Applicant: TSUBAKIMOTO CHAIN CO., Osaka-shi, Osaka (JP)

(72) Inventor: Shoichiro Komiya, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 0 days.

(21) Appl. No.: 15/035,169

(22) PCT Filed: Oct. 30, 2014

(86) PCT No.: PCT/JP2014/078915
§ 371 (c)(1),
(2) Date: May 6, 2016

(87) PCT Pub. No.: WO2015/068636
PCT Pub. Date: May 14, 2015

(65) Prior Publication Data
US 2016/0290438 A1    Oct. 6, 2016

(30) Foreign Application Priority Data
Nov. 11, 2013  (JP) .................. 2013-233355

(51) Int. Cl.
*F16G 13/16*    (2006.01)
*H02G 11/00*    (2006.01)
(Continued)

(52) U.S. Cl.
CPC ............. *F16G 13/16* (2013.01); *F16G 13/18* (2013.01); *H02G 3/0475* (2013.01); *H02G 11/006* (2013.01)

(58) Field of Classification Search
CPC ............... H02G 11/006; F16G 13/16
(Continued)

(56) References Cited

U.S. PATENT DOCUMENTS 4,570,437 A * 2/1986 Moritz .................. F16G 13/16
                                                                 16/266
5,836,148 A    11/1998 Fukao
(Continued)

FOREIGN PATENT DOCUMENTS

CN    1231717 A    10/1999
CN    1347482 A *  5/2002
(Continued)

OTHER PUBLICATIONS

International Preliminary Report on Patentability (Form PCT/IB/373) of Inernational Application No. PCT/JP2014/078915, dated May 17, 2016, with Form PCT/ISA/237. (6 pages).
(Continued)

*Primary Examiner* — David B Jones
(74) *Attorney, Agent, or Firm* — Westerman, Hattori, Daniels & Adrian, LLP

(57) ABSTRACT

Links constituting a device for guiding a long object are each provided with a pair of link portions, a first coupling portion for coupling the pair of link portions to each other, and a second coupling portion for coupling the pair of link portions at a position opposite to the first coupling portion. A long object is accommodated in an accommodation space defined by the link portions, the first coupling portions, and the second coupling portions. The first coupling portion constitutes a mounting member detachably attached to mounting portions of the pair of link portions. The first coupling portion has a hinge shaft at a first end and a hook portion at a second end. The mounting portion of each link portion has a bearing portion that supports the hinge shaft to be freely rotational while restricting movement thereof, and an engaging hole that is engaged with the hook.

5 Claims, 7 Drawing Sheets

(51) Int. Cl.
*F16G 13/18* (2006.01)
*H02G 3/04* (2006.01)

(58) Field of Classification Search
USPC .......................................................... 59/78.1
See application file for complete search history.

(56) References Cited

U.S. PATENT DOCUMENTS

| | | | |
|---|---|---|---|
| 5,881,548 A | | 3/1999 | Takahashi et al. |
| 6,067,788 A | | 5/2000 | Weber |
| 7,290,384 B2 | * | 11/2007 | Weber ..................... F16G 13/16 248/49 |
| 8,505,272 B1 | * | 8/2013 | Komiya ............... H02G 11/006 248/49 |
| 8,720,178 B2 | * | 5/2014 | Wendig ............... H02G 11/006 248/49 |
| 2002/0056336 A1 | | 5/2002 | Blase |
| 2004/0195832 A1 | | 10/2004 | Ikeda et al. |

FOREIGN PATENT DOCUMENTS

| | | |
|---|---|---|
| CN | 1525615 A | 9/2004 |
| EP | 0844415 B1 * | 9/2002 |
| JP | 2-526 Y2 | 1/1990 |
| JP | 9-210142 A | 8/1997 |
| JP | 9-324836 A | 12/1997 |
| JP | 10-176738 A | 6/1998 |
| JP | 2002-542439 A | 12/2002 |
| JP | 2013-36477 A | 2/2013 |

OTHER PUBLICATIONS

International Search Report dated Feb. 3, 2015, issued in counterpart International Application No. PCT/JP2014/078915 (2 pages).
Chinese Office Action dated Nov. 30, 2016, issued in counterpart Chinese Patent Application No. 201480061291.3 (7 pages).

* cited by examiner

DEVICE FOR GUIDING LONG OBJECT

BACKGROUND OF THE INVENTION

The present invention relates to a device for guiding a long object, which is, for example, a flexible cable for supplying electricity or a hose for supplying fluid to a movable unit, such as a machine tool, in accordance with movement of the movable unit with the long object, accommodated in the device.

A device for guiding a long object disclosed in Patent Document 1 includes links coupled to each other in a longitudinal direction. Each link includes a pair of opposing link portions, a first coupling portion, which couples the link portions to each other, and a second coupling portion, which opposes the first coupling portion and couples the link portions to each other. The device for guiding a long object accommodates a long object in an accommodation space defined by the link portions, the first coupling portion, and the second coupling portion of each link.

In such a device for guiding a long object, the first coupling portion is detachably mounted to the link portions for maintenance of the long object accommodated in the accommodation space. That is, C-shaped hooks are formed on the ends of the first coupling portion, and the hooks are engaged with hinge shafts provided on the link portions.

PRIOR ART DOCUMENT

Patent Document

Patent Document 1: Japanese Laid-Open Patent Publication No. 2013-36477

SUMMARY OF THE INVENTION

In the above-mentioned device for guiding a long object, if the entire guiding device is twisted by an external force or if the long object, which is accommodated in the accommodation space, moves and presses the first coupling portions outward from the accommodation space, the first coupling portions may possibly be detached from the link portions.

Accordingly, it is an objective of the present invention to provide a device for guiding a long object that prevents a component of the guiding device from being detached from another component.

Means and operational advantages for solving the above-described problem will now be described.

To achieve the foregoing objective and in accordance with one aspect of the present invention, a device for guiding a long object is provided. One link is constituted by a pair of link portions, which oppose each other along a first axis, a first coupling portion, which couples the pair of link portions to each other, and a second coupling portion, which couples the pair of link portions to each other at a position opposite to the first coupling portion. In a state in which a plurality of the links are arranged along a second axis, which is orthogonal to the first axis, two adjacent links are coupled to each other to be freely rotational. The link portions of the links, the first coupling portions, and the second coupling portions define an accommodation space, which accommodates a long object. The device is capable of guiding the long object in accordance with movement of one of the links located at an end portion. At least either of the first coupling portion and the second coupling portion configures a mounting member, which is detachably mounted on each pair of link portions and extends along the first axis. Each pair of link portions includes mounting portions to which the mounting member can be mounted. Each mounting member includes a hinge shaft on a first end on the first axis and a hook on a second end on the first axis, the hinge shaft extending along the second axis. Each pair of link portions includes a first link portion. The mounting portion of the first link portion includes one of a bearing portion and a set of a bearing portion and a hook engaging portion. The bearing portion is capable of supporting the hinge shaft to be freely rotational while restricting movement of the hinge shaft along a third axis, which is orthogonal to both the first axis and the second axis, and the hook engaging portion is capable of being engaged with the hook. The mounting portion of a second link portion of each pair of link portions includes one of the hook engaging portion and the set of the bearing portion and the hook engaging portion.

With this configuration, movement of the hinge shaft along the third axis is restricted by supporting the hinge shaft at the bearing portion and engaging the hook with the hook engaging portion. Thus, a component, or the mounting member, is prevented from being detached from another component, or the mounting portion, by an external force.

In the above described device for guiding a long object, each mounting portion preferably includes a first engaging portion, and each mounting member preferably includes a second engaging portion, which engages with the first engaging portion on the first axis when the hook is engaged with the hook engaging portion in a state in which the hinge shaft is supported by the bearing portion.

With this configuration, the engagement between the first engaging portion and the second engaging portion prevents the mounting member from being detached from the mounting portion even if an external force is applied such that the pair of link portions separate from and approach each other on the first axis.

In the above described device for guiding a long object, each mounting portion preferably includes a restricting portion, which restricts the hinge shaft from moving along the first axis when the mounting member is rotated with the hinge shaft being supported by the bearing portion.

With this configuration, when the mounting member is rotated with the hinge shaft being supported by the bearing portion, the restricting portion prevents the hinge shaft from falling off the bearing portion.

In the above described device for guiding a long object, each hook preferably engages with the associated hook engaging portion from an inner side of the associated link toward an outer side of the link.

In general, when load is applied to the links, force is applied in a direction that causes the pair of link portions to tilt inward. In this respect, even if the pair of link portions tilt inward, this configuration increases the engagement between the hook and the hook engaging portion since the hook is engaged with the engaging portion from the inner side of the link toward the outer side. Thus, even if load is applied to the links, the hook is prevented from being disengaged from the hook engaging portion.

In the above described device for guiding a long object, each mounting portion preferably includes both the bearing portion and the hook engaging portion.

With this configuration, since the hinge shaft and the hook of the mounting member can be mounted on either of the mounting portions of the pair of link portions, the mounting member can be mounted on the mounting portions of the pair of link portions regardless of the orientation of the mounting member along the first axis.

In the above described device for guiding a long object, each mounting member preferably includes a cutout portion at each of both ends, and each mounting portion preferably includes a notch engaging portion, which is capable of being engaged with the cutout portion.

With this configuration, the engagement between the cutout portions and the notch engaging portions increases the torsional rigidity of the device for guiding a long object.

The present invention prevents a component of the device for guiding a long object from being detached from another component.

DETAILED DESCRIPTION OF THE PREFERRED EMBODIMENTS

A device for guiding a long object according to one embodiment will now be described with reference to the drawings.

Figure 1:
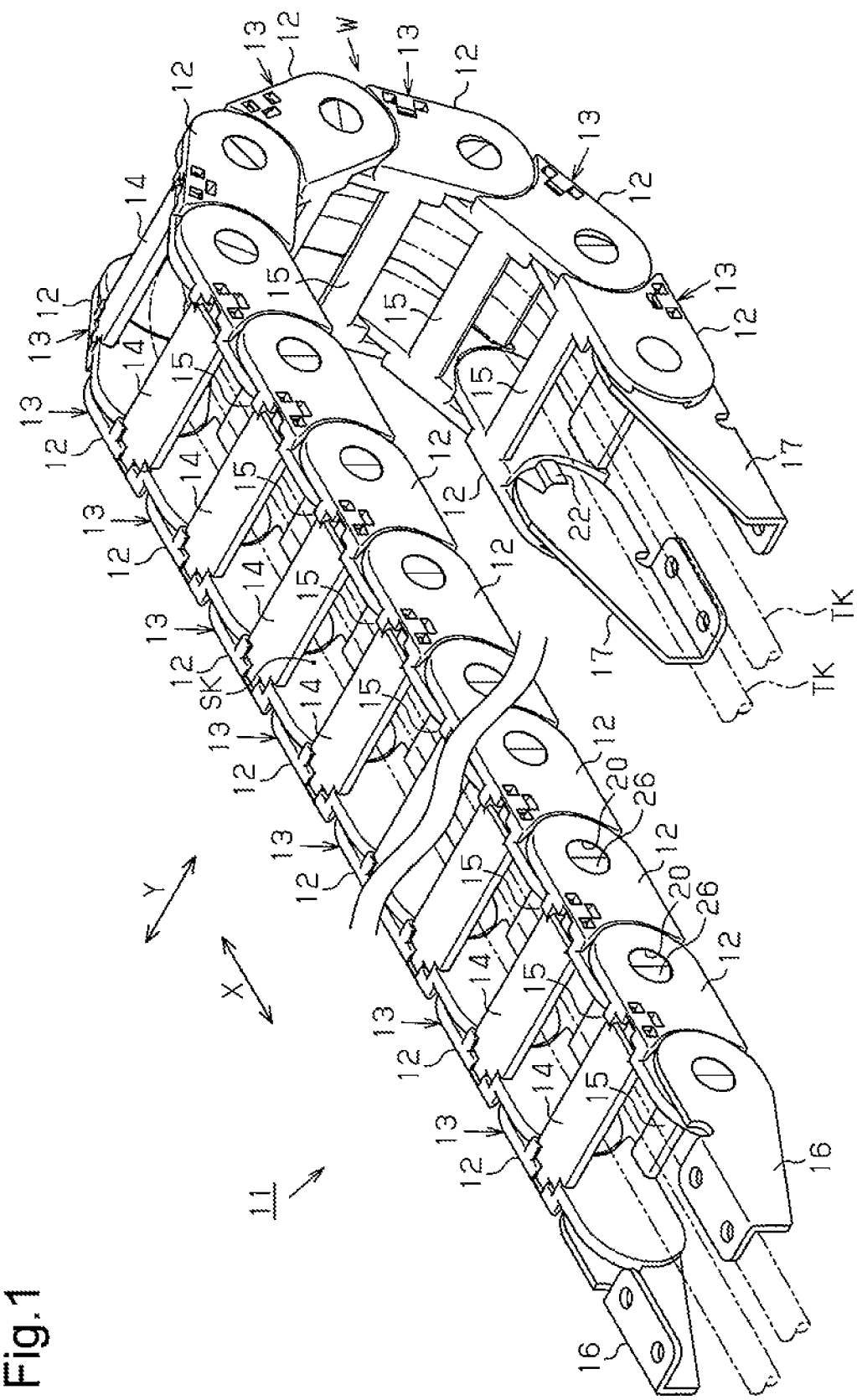
FIG. 1 is a perspective view of a device for guiding a long object according to one embodiment.

As shown in FIG. 1, a long object guiding device 11 includes links 13, first coupling portions 14, and second coupling portions 15. The long object guiding device 11 is made of a plastic. Each link 13 includes a pair of link portions 12, which oppose each other along a first axis, that is, a y-axis. The link portions 12 in each pair are coupled to each other with the associated first coupling portion 14. The link portions 12 in each pair are coupled to each other with the associated second coupling portion 15 at a position opposite to the first coupling portion 14, which couples the link portions 12. The link portions 12, the first coupling portions 14, and the second coupling portions 15 all have a plate-like shape. Each link 13 is coupled to the adjacent links 13 to be freely rotational with respect to each other, and the links 13 can be arranged in series along an x-axis perpendicular to the y-axis, that is, a second axis.

Coupling parts 16 are coupled to one of the links 13 located at the leading end (hereinafter, referred to as a leading end link 13) to be freely rotational. The coupling parts 16 are coupled to a movable body (not shown) that reciprocates along the x-axis in a machine such as a machine tool. Securing parts 17 to be secured to a securing portion (not shown) of the machine are coupled to one of the links 13 located at the trailing end (hereinafter, referred to as a trailing end link 13) to be freely rotational.

Long objects TK that can be flexibly bent are accommodated in an accommodation space SK, which is defined by pairs of link portions 12, the first coupling portions 14, and the second coupling portions 15 of the links 13. Thus, the long objects TK are protected by the long object guiding device 11. The long object guiding device 11 guides the long objects TK accommodated in the accommodation space SK in accordance with the movement of the leading end link 13, that is, reciprocation of the movable body (not shown).

In the present embodiment, the long object guiding device 11 is arranged such that a curved portion W is formed in the middle portion as shown in FIG. 1. The curved portion W moves in accordance with movement of the leading end link 13 along the x-axis. The long objects TK include, for example, an electric cable for supplying electricity to the movable body, an optical fiber cable for transmitting signals to the movable body, a hose for supplying gas (for example, air) or liquid (for example, water or oil) to the movable body, and a long articulated member capable of flexibly bending.

Figure 2:
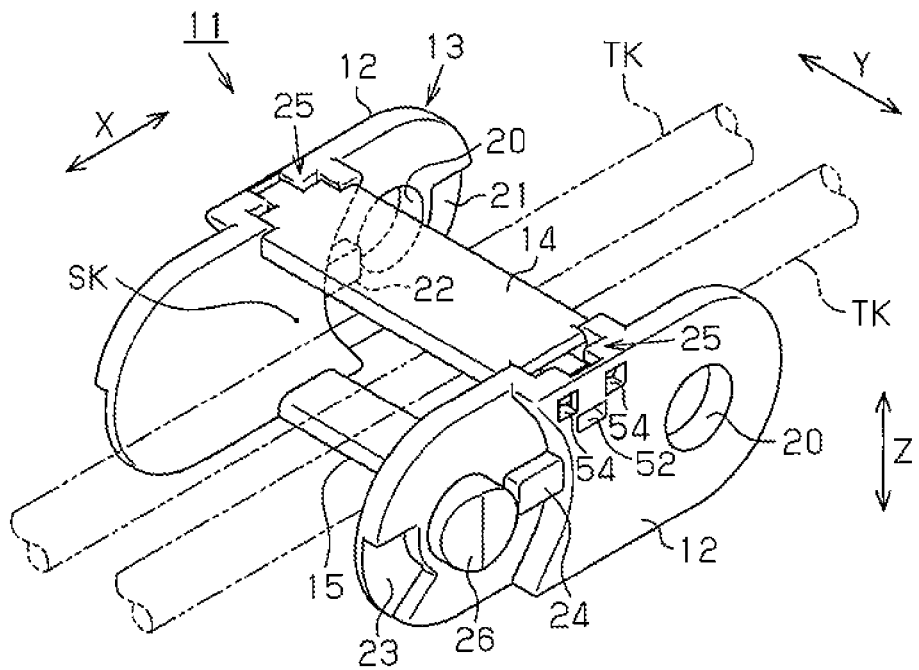
FIG. 2 is a perspective view of part of the device for guiding a long object shown in FIG. 1.

As shown in FIG. 2, in the long object guiding device 11, each first coupling portion 14 is detachably mounted to the associated pair of link portions 12, which configure one of the links 13. Each second coupling portion 15 is formed integrally with the associated pair of link portions 12, which configure one of the links 13. Thus, in the present embodiment, each first coupling portion 14 configures the mounting member.

The link portions 12 extend along the x-axis and are formed of substantially rectangular plate material with rounded ends on the x-axis. A first end of each link portion 12 includes a coupling hole 20. A coupling protrusion 26 is formed on the outer surface of a second end of each link portion 12 located opposite to the first end. The coupling protrusion 26 is rotationally fitted to the associated coupling hole 20 of another link portion 12 that is adjacent on the x-axis.

As shown in FIG. 2, a sectorial inner recess 21, which is adjacent to the coupling hole 20, is formed on the inner surface of the first end of each link portion 12. A rectangular parallelepiped inner protrusion 22 is formed on the inner surface of each link portion 12 at such a position that the inner protrusion 22 and the inner recess 21 sandwich the coupling hole 20. The coupling hole 20, the inner recess 21, and the inner protrusion 22 are arranged along the x-axis.

A sectorial outer recess 23 is formed on the outer surface of the second end of each link portion 12. A rectangular parallelepiped outer protrusion 24 is formed on the outer surface of each link portion 12 at such a position that the outer protrusion 24 and the outer recess 23 sandwich the coupling protrusion 26. The outer recess 23, the coupling protrusion 26, and the outer protrusion 24 are arranged along the x-axis.

In a state in which the coupling holes 20 and the coupling protrusions 26 on the link portions 12 of the two links 13 that are adjacent to each other along the x-axis are fitted to each other, the outer protrusions 24 are accommodated in the inner recesses 21 and the inner protrusions 22 are accommodated in the outer recesses 23. The inner protrusions 22 and the outer protrusions 24 are respectively rotational in the outer recesses 23 and the inner recesses 21 in the circumferential direction of the coupling hole 20 at a predetermined angular range (for example, 15 degrees).

A third axis that is orthogonal to the x-axis and the y-axis is referred to as a z-axis. A mounting portion 25 for mounting the first coupling portion 14 is provided at the center portion on the side edge of each link portion 12 opposite to the second coupling portion 15 on the z-axis.

The configuration of the first coupling portion 14 will now be described.

Figure 3:
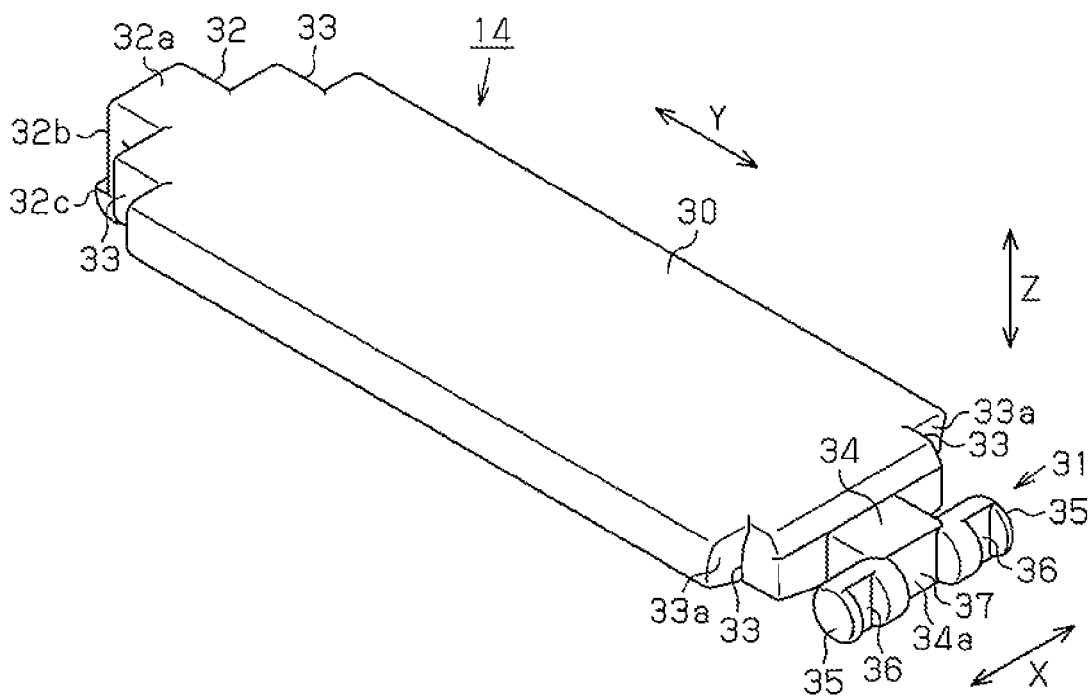
FIG. 3 is a perspective view of a first coupling portion, which configures the device for guiding a long object shown in FIG. 1, as viewed from the side with the hinge shaft.

As shown in FIG. 3, the first coupling portion 14 includes a substantially rectangular main body portion 30, which extends in the y-axis. The main body portion 30 includes a first end and a second end in the y-axis. The first coupling portion 14 further includes a hinge portion 31, which is provided on the first end of the main body portion 30, and a hook 32, which is provided on the second end of the main body portion 30.

A cutout portion 33, which is formed by cutting out a part of the main body portion 30 in an L shape, is provided at each of the two corners of the first end and each of the two corners of the second end in the main body portion 30. That is, each of the four corners of the main body portion 30 has the cutout portion 33.

Inclined surfaces 33a, which tilt with respect to the z-axis, are formed at the two cutout portions 33 located in the vicinity of the hinge portion 31. The inclined surfaces 33a are inclined inward from the outer side (upper side in FIG. 3) of the main body portion 30 toward the inner side (lower side in FIG. 3) of the main body portion 30.

The hinge portion 31 includes a support portion 34 and a pair of hinge shafts 35. The support portion 34 is a rectangular parallelepiped and is provided at the center of the first end of the main body portion 30. The pair of hinge shafts 35 is provided on the side surfaces of the support portion 34 to protrude in the opposite directions on the x-axis. The hinge shafts 35 are substantially columnar, and the axis of each hinge shaft 35 extends along the x-axis. The pair of hinge shafts 35 protrudes outward from a distal end surface 34a of the support portion 34 on the y-axis.

A hinge recess 36 is cut out from the outer circumferential surface of each hinge shaft 35 along the z-axis. Also, a center recess 37 is formed by the inner surfaces of the pair of hinge shafts 35 on the x-axis and the distal end surface 34a of the support portion 34. The center recess 37 is deeper than the hinge recesses 36, and the width of the center recess 37 along the x-axis is wider than that of the hinge recesses 36.

Figure 4:
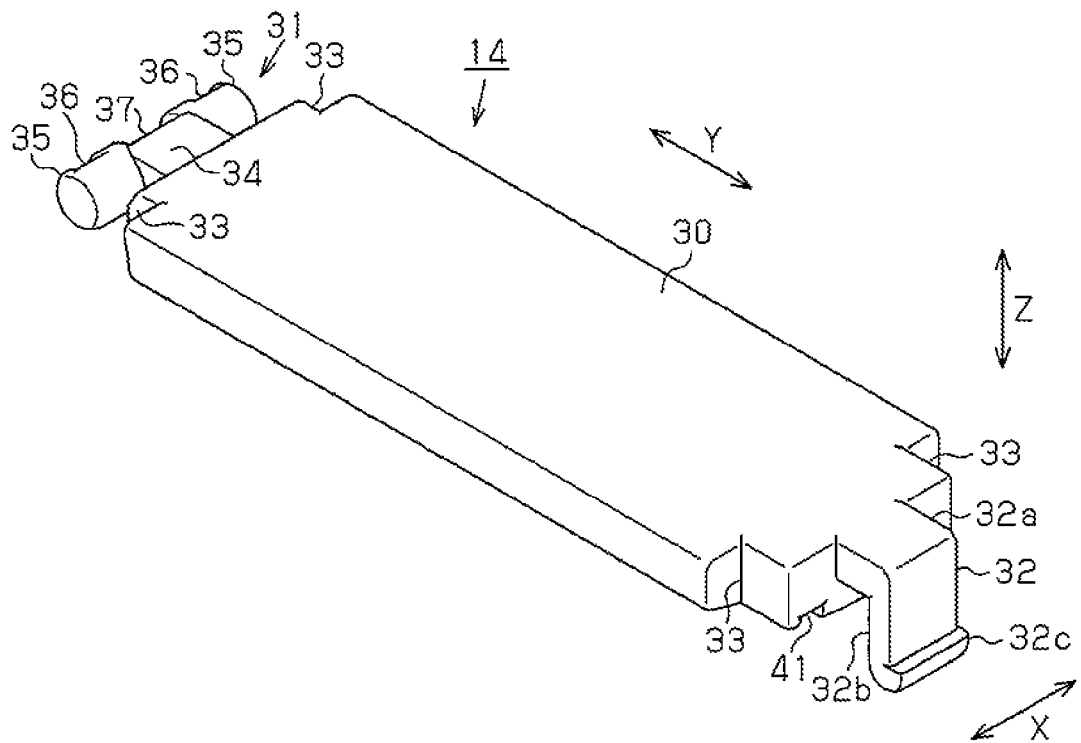
FIG. 4 is a perspective view of the first coupling portion shown in FIG. 3 as viewed from the side with the hook.

As shown in FIG. 4, the hook 32 includes an extended portion 32a, a suspended portion 32b, and a claw 32c and is a substantially inverted L-shaped plate. The extended portion 32a extends from the center portion of the second end of the main body portion 30 outward on the y-axis. The suspended portion 32b extends from the distal end of the extended portion 32a toward the inner side of the main body portion 30 on the z-axis (downward in FIG. 4). The claw 32c projects from the distal end of the suspended portion 32b outward on the y-axis.

Figure 5:
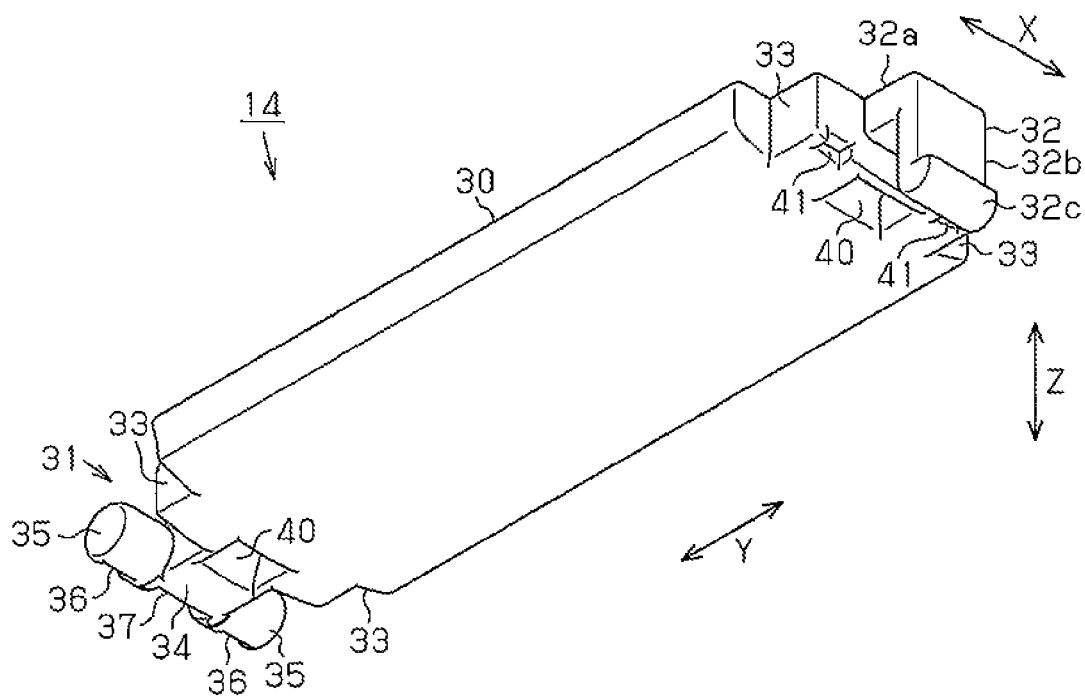
FIG. 5 is a perspective view of the first coupling portion shown in FIG. 3 as viewed from the side with the engaging recesses.

One example of a second engaging portion includes engaging recesses 40. As shown in FIG. 5, the engaging recesses 40 are formed in the inner surface (lower surface in FIG. 5) of the main body portion 30 in the vicinity of the hinge portion 31 and in the vicinity of the hook 32. Two cutout recesses 41 are provided on both sides of the engaging recess 40 located in the vicinity of the hook 32. The cutout recesses 41 are smaller than the engaging recess 40.

In this case, the cutout recesses 41 are formed to extend from the inner surface (lower surface in FIG. 5) of the main body portion 30 to the end surface of the second end on which the hook 32 is provided. The cutout recesses 41 are arranged to correspond to the hinge recesses 36 of the hinge portion 31 on the y-axis.

The configuration of the mounting portions 25 provided on the link portions 12 will now be described.

Figure 6:
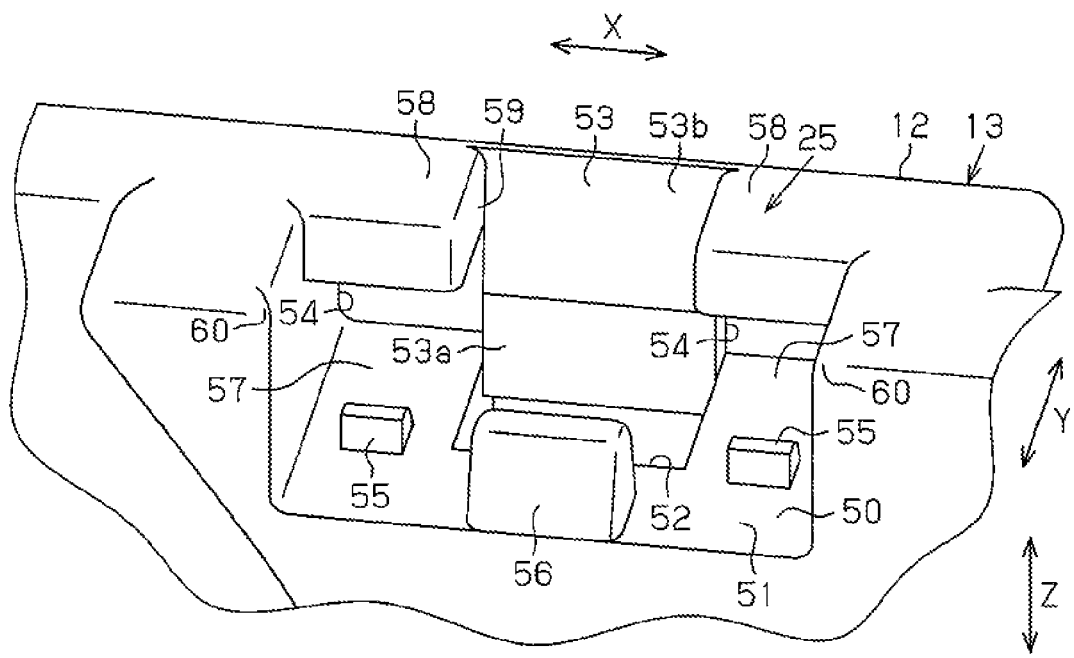
FIG. 6 is an enlarged perspective view of a mounting portion formed on a link portion, which configures the device for guiding a long object shown in FIG. 1.

As shown in FIGS. 2 and 6, each mounting portion 25 includes a mounting recess 50, which opens at a position on the inner side of the link 13 on the y-axis and opposite to the second coupling portion 15 on the z-axis. A bottom surface 51 of the mounting recess 50 has a substantially rectangular shape and is configured by a plane orthogonal to the z-axis.

Figure 9:
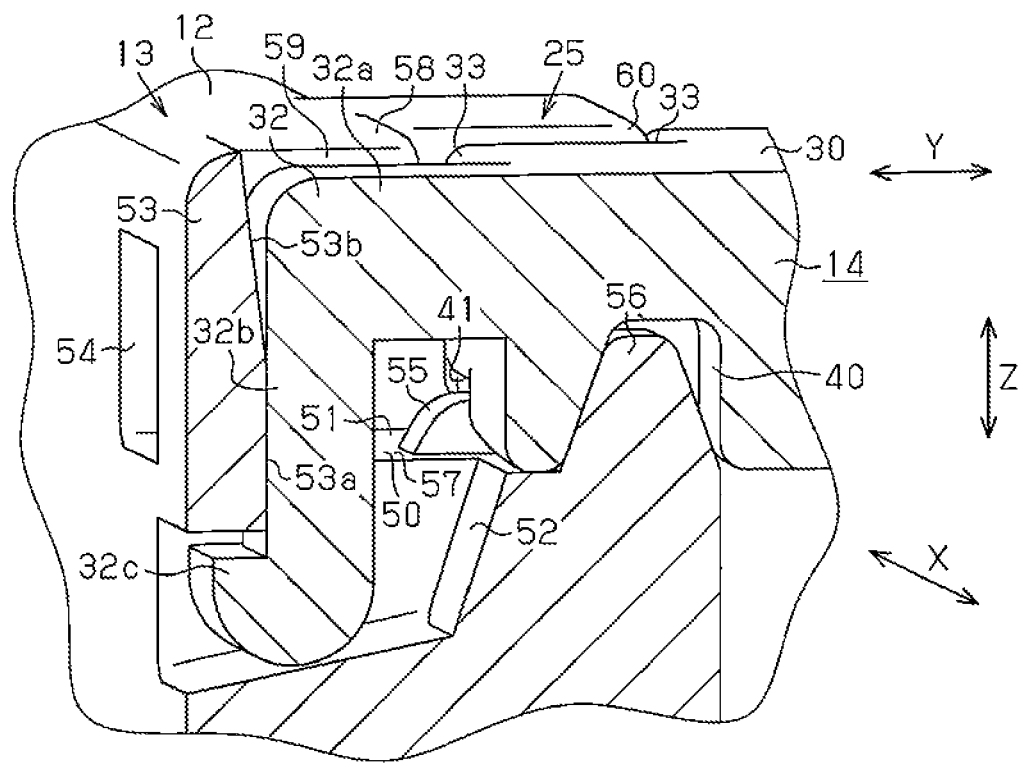
FIG. 9 is a cutaway perspective view of the hook of the first coupling portion shown in FIG. 3 engaged with the engaging hole of the mounting portion shown in FIG. 6.

One example of a hook engaging portion includes an engaging hole 52. As shown in FIGS. 6 and 9, the engaging hole 52 is formed at the center portion of the bottom surface 51 of the mounting recess 50. The engaging hole 52 is capable of being engaged with the hook 32 of the first coupling portion 14. The engaging hole 52 extends outward on the y-axis of the link 13 and opens in the outer surface of the link portion 12.

As shown in FIG. 9, in a state in which the hook 32 is engaged with the engaging hole 52, movement of the hook 32 on the z-axis is restricted, and the claw 32c of the hook 32 is exposed on the outer side of the link portion 12 via the engaging hole 52. In this case, the hook 32 engages with the engaging hole 52 from the inner side of the link 13 toward the outer side on the y-axis.

The mounting recess 50 includes an outer wall 53. A pair of openings 54 is formed on the inner surface of the outer wall 53 to be located on both sides of the engaging hole 52. The width of the openings 54 on the x-axis is less than the width of the hinge shafts 35 (see FIG. 3) of the first coupling portion 14 on the x-axis. As apparent from FIGS. 6, 7, and 8, the inner surface of the outer wall 53 (the inner surface of the mounting recess 50) is configured by two surfaces divided along the z-axis. Substantially half of the surface close to the engaging hole 52 forms a plane 53a, which extends parallel to the z-axis, and substantially half of the surface away from the engaging hole 52 on the z-axis forms an inclined surface 53b, which is inclined outward with respect to the z-axis.

Figure 7:
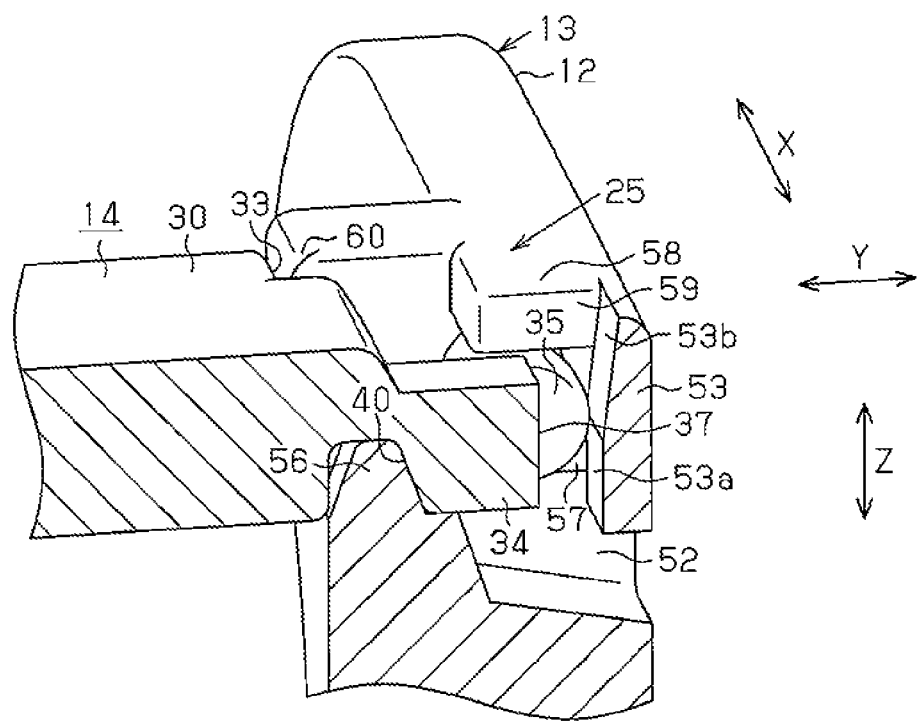
FIG. 7 is a cutaway perspective view of the hinge shaft of the first coupling portion shown in FIG. 3 supported by the bearing portion of the mounting portion shown in FIG. 6.
Figure 8:
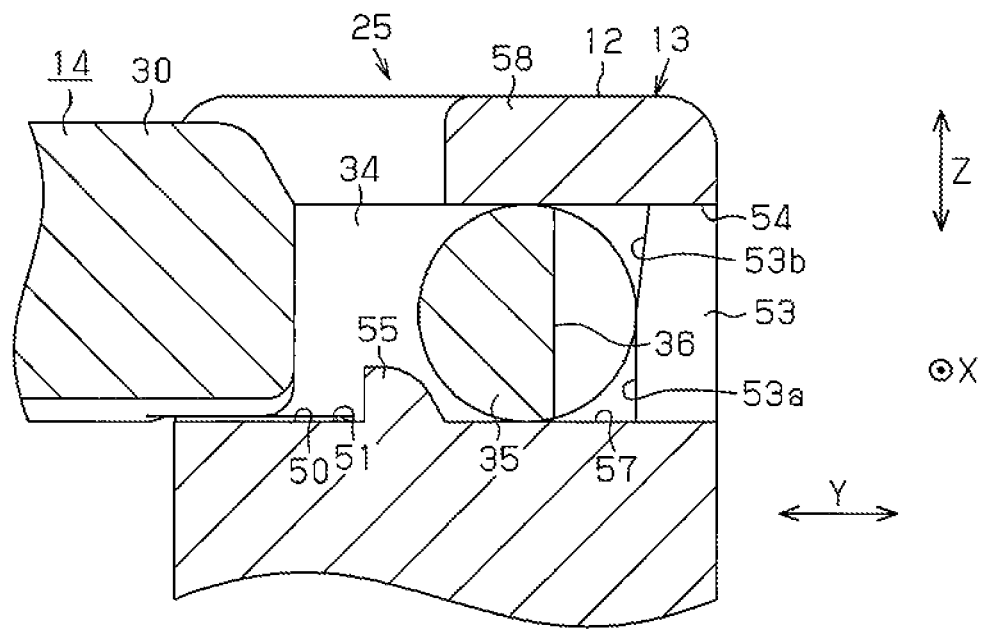
FIG. 8 is a cross-sectional view of the hinge shaft of the first coupling portion shown in FIG. 3 supported by the bearing portion of the mounting portion shown in FIG. 6.

One example of a restricting portion includes a pair of restricting protrusions 55. As shown in FIGS. 6, 7, and 8, the restricting protrusions 55 are provided on both sides of the engaging hole 52 on the x-axis at the bottom surface 51 of the mounting recess 50. The restricting protrusions 55 are set to a size that allows the restricting protrusions 55 to be accommodated in the hinge recesses 36 (see FIG. 3) and the cutout recesses 41 (see FIG. 4) of the first coupling portion 14.

One example of a first engaging portion includes an engaging protrusion 56. The engaging protrusion 56 is provided on the bottom surface 51 of the mounting recess 50 at a position opposite to the outer wall 53. The engaging hole 52 opens between the engaging protrusion 56 and the outer wall 53. The engaging protrusion 56 is greater than the restricting protrusions 55. The engaging protrusion 56 can be accommodated in the engaging recess 40 of the first coupling portion 14 in an engaged state and is set to a size that allows the engaging protrusion 56 to be accommodated in the center recess 37 of the first coupling portion 14.

Portions on the bottom surface 51 of the mounting recess 50 between the pair of restricting protrusions 55 and the openings 54 configure shaft support surfaces 57, which are capable of supporting the pair of hinge shafts 35 of the first coupling portion 14 to be freely rotational. That is, the shaft support surfaces 57 are arranged on both sides of the engaging hole 52 on the x-axis.

Rectangular plate-like restricting walls 58 are provided on the outer wall 53 to face the shaft support surfaces 57 of the mounting recess 50. The restricting walls 58 restrict the hinge shafts 35 supported by the shaft support surfaces 57 from moving toward the side opposite to the engaging hole 52 on the z-axis. A gap 59, which has the same width as the width of the engaging hole 52 on the x-axis, is formed between the pair of restricting walls 58.

Two inner corners located on the rim of the opening of the mounting recess 50 on both side walls of the mounting recess 50 on the x-axis configure engaging portions 60, which are capable of engaging with the cutout portions 33 of the first coupling portion 14.

In the present embodiment, the outer wall 53, the shaft support surfaces 57, and the restricting walls 58 configure a bearing portion. The bearing portion is capable of accommodating and supporting the pair of hinge shafts 35 of the first coupling portion 14 to be freely rotational while restricting the movement along the z-axis. Thus, each mounting portion 25 has both the bearing portion and the engaging hole 52 (the hook engaging portion).

Operation for mounting each first coupling portion 14 to the mounting portions 25 of the associated link 13 will now be described.

Figure 10:
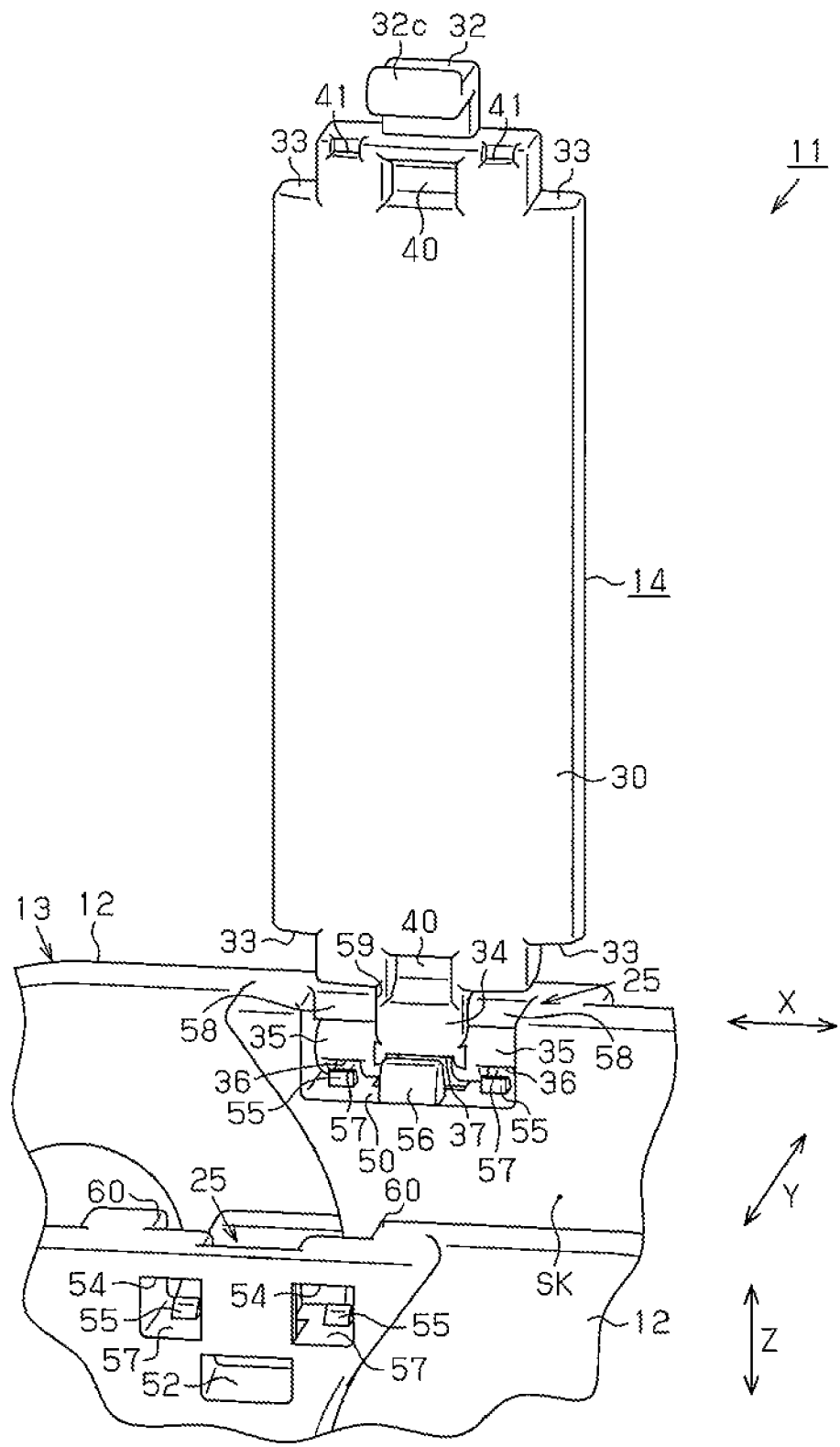
FIG. 10 is a perspective view of the first coupling portion shown in FIG. 3 mounted on the mounting portion of the link portion shown in FIG. 6.

When mounting the first coupling portion 14 on the mounting portions 25, the first coupling portion 14 is arranged upright along the z-axis as shown in FIG. 10. In this state, the first coupling portion 14 is moved along the y-axis such that the hinge shafts 35 are inserted in the mounting recess 50 toward the outer side of the link 13 from the inner side of the link 13. Thus, the restricting protrusions 55 pass by the hinge recesses 36 of the hinge shafts 35 and the engaging protrusion 56 passes by the center recess 37 so that the hinge shafts 35 are supported by the shaft support surfaces 57 and the support portion 34 is inserted in the gap 59. At this time, the hinge shafts 35 contact the plane 53*a* of the outer wall 53 (see FIG. 8).

Figure 11:
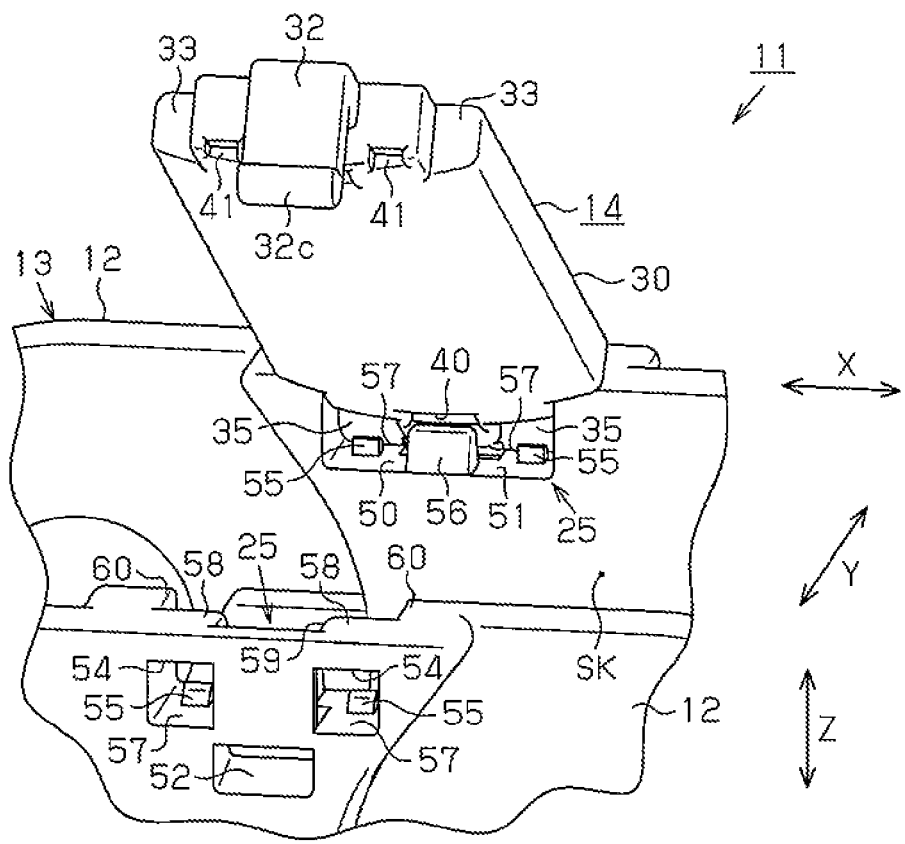
FIG. 11 is a perspective view showing a state in which the first coupling portion shown in FIG. 3 mounted on the mounting portion of the link portion shown in FIG. 6 is rotated.

Subsequently, as shown in FIG. 11, the first coupling portion 14 is rotated toward the inner side of the link 13 about the hinge shafts 35. The rotation of the first coupling portion 14 causes the peripheral edges of the hinge recesses 36 of the hinge shafts 35 to be rotated and enter the space between the restricting protrusions 55 and the outer wall 53. Thus, when the hinge shafts 35 slide on the shaft support surfaces 57 to move toward the inner side of the link 13 on the y-axis, or in a direction opposite to the entering direction, the peripheral edges of the hinge recesses 36 of the hinge shafts 35 abut against the restricting protrusions 55, and the restricting protrusions 55 restrict the movement of the hinge shafts 35. Therefore, the hinge shafts 35 are rotated on the shaft support surfaces 57.

The first coupling portion 14 is further rotated toward the inner side of the link 13 about the hinge shafts 35. The claw 32*c* of the hook 32 of the first coupling portion 14 abuts against the inclined surface 53*b* of the outer wall 53. As the first coupling portion 14 is further rotated about the hinge shafts 35 toward the inner side of the link 13, the suspended portion 32*b* of the hook 32 flexes toward the inner side of the link 13, and the claw 32*c* of the hook 32 slides on the inclined surface 53*b* toward the plane 53*a*.

Figure 12:
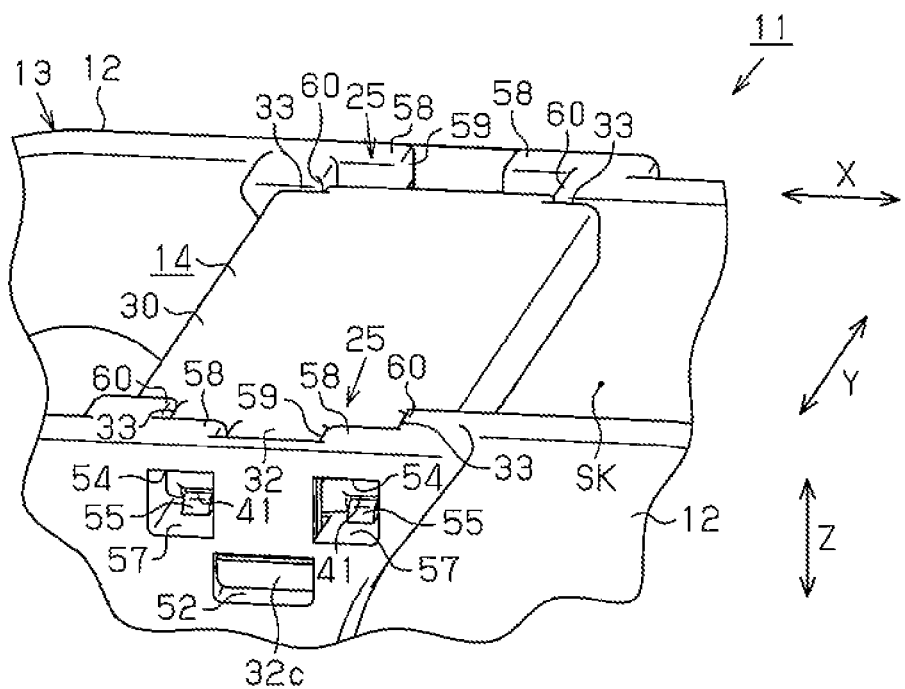
FIG. 12 is a perspective view showing a state in which the first coupling portion shown in FIG. 3 is mounted on the link portions shown in FIG. 6.

As shown in FIGS. 9 and 12, when the claw 32*c* reaches the engaging hole 52, the suspended portion 32*b* of the hook 32 that has been flexed toward the inner side of the link 13 is restored to the original shape by the elastic restoring force of the suspended portion 32*b*, and the claw 32*c* engages with the engaging hole 52.

The engagement of the claw 32*c* of the hook 32 with the engaging hole 52 restricts rotation of the first coupling portion 14. This completes mounting of the first coupling portion 14 to the mounting portions 25 of the link 13. At this time, the cutout portions 33 of the first coupling portion 14 engage with the notch engaging portions 60 of the mounting portions 25.

Furthermore, as shown in FIGS. 7 and 9, the engaging protrusion 56 of each mounting portion 25 is inserted in the associated engaging recess 40 of the first coupling portion 14, and the restricting protrusions 55 of the mounting portion 25 are inserted in the cutout recesses 41 of the first coupling portion 14. In this case, the engagement between each engaging recess 40 and the associated engaging protrusion 56 restricts the movement of the first coupling portion 14 along the y-axis. The engaging surface of each engaging recess 40 and the engaging surface of each engaging protrusion 56 are inclined.

In a state in which the first coupling portion 14 is mounted on the mounting portions 25 of the link 13, the hinge shafts 35 are restricted from moving in a detaching direction along the z-axis by the restricting walls 58, and the hook 32 is restricted from moving in the detaching direction along the z-axis by the engagement between the claw 32*c* and the engaging hole 52.

Furthermore, in a state in which the first coupling portion 14 is mounted on the mounting portions 25 of the link 13, the movement of the main body portion 30 along the y-axis is restricted by the engagement between the engaging recesses 40 with the engaging protrusions 56, and the movement of the main body portion 30 along the x-axis is restricted by the engagement between the cutout portions 33 with the notch engaging portions 60. Thus, in a state in which the first coupling portion 14 is mounted on the mounting portions 25 of the link 13, even if an external force is applied to the long object guiding device 11, the first coupling portion 14 is prevented from being detached from the mounting portions 25.

Furthermore, the engagement between the cutout portions 33 of the first coupling portion 14 with the engaging portions 60 of the mounting portions 25 increases the torsional rigidity of the long object guiding device 11. As a result, even if a torsional force is applied to the long object guiding device 11, the long object guiding device 11 resists deformation, and thus the first coupling portion 14 is prevented from being detached from the mounting portions 25.

When the first coupling portion 14 is to be detached from the mounting portions 25 of the link 13, the claw 32*c* is pressed toward the inner side of the link 13 with a tool such as a screwdriver from the engaging hole 52 that opens in the outer surface of the associated link portion 12. This elastically deforms the suspended portion 32*b* of the hook 32 toward the inner side of the link 13, and disengages the claw 32*c* from the engaging hole 52.

In this state, the first coupling portion 14 is rotated about the hinge shafts 35 and is brought into the upright position as shown in FIG. 10. The first coupling portion 14 can be detached from the mounting portion 25 by subsequently moving the first coupling portion 14 such that the hinge shafts 35 move toward the inner side of the link 13 from the mounting recess 50.

In general, the first coupling portion 14 is rotated with the hinge shafts 35 being supported by the shaft support surfaces 57 of the mounting recess 50 to be used as a lid for selectively opening and closing the accommodation space SK. The first coupling portion 14 is rotated about the hinge shafts 35 when mounting and removing the long objects TK in and out of the accommodation space SK or for maintenance of the long objects TK accommodated in the accommodation space SK.

The present embodiment as described above achieves the following advantages.

(1) Among each pair of opposing link portions 12 of the long object guiding device 11, the bearing portion of the mounting portion 25 of a first link portion 12 supports the hinge shafts 35 of the first coupling portion 14 to be freely rotational while restricting the movement of the hinge shafts 35 along the z-axis, and the engaging hole 52 of the mounting portion 25 of a second link portion 12 is engaged with the claw 32c of the hook 32 of the first coupling portion 14. Thus, unless the claw 32c of the hook 32 is disengaged from the engaging hole 52, the hinge shafts 35 will not be detached from the mounting portion 25. Therefore, even if an external force is applied to the long object guiding device 11, the first coupling portion 14 is prevented from being detached from the mounting portions 25.

(2) In the long object guiding device 11, each mounting portion 25 includes the engaging protrusion 56. The first, coupling portion 14 includes the engaging recesses 40, which engage with the engaging protrusions 56 when the claw 32c of the hook 32 is engaged with the engaging hole 52 in a state in which the hinge shafts 35 are supported by the bearing portion. Thus, the engagement between the engaging protrusions 56 and the engaging recesses 40 prevents the first coupling portion 14 from being detached from the mounting portions 25 even if an external force is applied to the long object guiding device 11 in such a manner that the pair of link portions 12 move away from and toward each other on the y-axis.

(3) In the long object guiding device 11, each mounting portion 25 includes the restricting protrusions 55, which restrict the hinge shafts 35 from moving along the y-axis when the first coupling portion 14 is rotated with the hinge shafts 35 being supported by the bearing portion. Thus, when the first coupling portion 14 is rotated with the hinge shafts 35 being supported by the bearing portion of the mounting portion 25, the restricting protrusions 55 prevent the hinge shafts 35 from being falling off the bearing portion.

(4) In general, when load is applied to the links 13, each pair of link portions 12 is apt to tilt inward. In this respect, in the long object guiding device 11 according to the present embodiment, the claw 32c of the hook 32 is engaged with the engaging hole 52 from the inner side of the link 13 toward the outer side. Thus, when each pair of link portions 12 tilts inward, an engaging force between the claw 32c of the hook 32 and the engaging hole 52 is increased. As a result, even if load is applied to each link 13, the claw 32c of the hook 32 is prevented from being disengaged from the engaging hole 52.

(5) Each mounting portion 25 of the long object guiding device 11 includes both the bearing portion and the engaging hole 52. Thus, the hinge shafts 35 of the first coupling portion 14 and the hook 32 can be attached to either of the mounting portions 25 of the pair of link portions 12. Thus, the first coupling portion 14 can be mounted on the mounting portions 25 regardless of the orientation of the first coupling portion 14.

(6) In the long object guiding device 11, the main body portion 30 of the first coupling portion 14 includes the cutout portions 33 at the four corners. The mounting portions 25 include the notch engaging portions 60, which are capable of engaging with the cutout portions 33. Thus, when the first coupling portion 14 is mounted on the mounting portions 25, the cutout portions 33 are engaged with the notch engaging portions 60 so that the torsional rigidity of the long object guiding device 11 is increased. That is, even if a torsional force is applied to the long object guiding device 11, the torsional force is received by the engaging portions between the cutout portions 33 and the notch engaging portions 60. This prevents the long object guiding device 11 from being deformed.

(7) In the long object guiding device 11, each cutout portion 33 of the first coupling portion 14 includes the inclined surface 33a. Thus, when the first coupling portion 14 is rotated about the hinge shafts 35, the cutout portions 33 are prevented from interfering with the notch engaging portions 60.

Modifications

The above described embodiment may be modified as follows.

The cutout portions 33 do not necessarily have to be provided on the main body portion 30 of the first coupling portion 14. In this case, the width of the main body portion 30 of the first coupling portion 14 along the x-axis is preferably set such that the main body portion 30 can be accommodated in the mounting recesses 50 of the mounting portions 25.

The mounting portion 25 of one of the pair of link portions 12 may include only the bearing portion, and the mounting portion 25 of the other one of the link portions 12 may include only the engaging hole 52.

The claw 32c of the hook 32 may be configured to engage with the engaging hole 52 from the outer side of the link 13 (the link portion 12).

At least one of the two restricting protrusions 55 of the mounting portion 25 may be omitted.

The engaging protrusions 56 of the mounting portions 25 and the engaging recesses 40 of the first coupling portion 14 may be omitted.

Each mounting portion 25 may include a recess as the first engaging portion instead of the engaging protrusion 56, and the first coupling portion 14 may include, instead of the engaging recesses 40, protrusions as the second engaging portion for engaging with the above-mentioned recesses.

The second coupling portion 15 may be configured to be detachable with respect to the pair of link portions 12, which configure each link 13. That is, the second coupling portion 15 may be the mounting member in addition to the first coupling portion 14. In this case, mounting portions are provided for detachably mounting the second coupling portion 15 at a position of the link 13 opposite to the first coupling portion 14.

DESCRIPTION OF THE REFERENCE NUMERALS

11 . . . device for guiding a long object, 12 . . . link portion, 13 . . . link, 14 . . . one example of mounting member, which is first coupling portion, 15 . . . second coupling portion, 25 . . . mounting portion, 32 . . . hook, 33 . . . cutout portion, 35 . . . hinge shaft, 40 . . . one example of second engaging portion, which is engaging recess, 52 . . . one example of hook engaging portion, which is engaging hole, 53 . . . outer wall, which configures bearing portion, 55 . . . one example of restricting portion, which is restricting protrusion, 56 . . . one example of first engaging portion, which is engaging protrusion, 57 . . . shaft support surface, which configures bearing portion, 58 . . . restricting wall, which configures bearing portion, 60 . . . notch engaging portion, SK . . . accommodation space, TK . . . long object, X . . . second axis, Y . . . first axis, Z . . . third axis.

The invention claimed is:

1. A device for guiding a long object, wherein
one link is constituted by a pair of link portions opposed to each other along a first axis,
a first coupling portion which couples the pair of link portions to each other, and a second coupling portion which couples the pair of link portions to each other at a position opposite to the first coupling portion,
a plurality of the links are arranged along a second axis, which is orthogonal to the first axis, and at least two adjacent links are coupled to each other in a freely rotational manner,
the link portions of the links, the first coupling portions, and the second coupling portions define an accommodation space configured to accommodate a long object,
the device being configured so as to guide the long object in accordance with movement of one of the links located at an end portion,
at least either of the first coupling portion and the second coupling portion includes a mounting member,
the mounting member is detachably mounted on each pair of link portions and extends along the first axis,
each pair of link portions includes mounting portions configured to be mountable with the mounting member,
each mounting member includes a hinge shaft on a first end on the first axis and a hook on a second end on the first axis opposite to the first end, the hinge shaft extending along the second axis,
each of said pair of link portions includes a first link portion, wherein the mounting portion of the first link portion includes a bearing portion and a hook engaging portion,
wherein the bearing portion is configured to support the hinge shaft in a freely rotational manner while restricting movement of the hinge shaft along a third axis which is orthogonal to both the first axis and the second axis, and the hook engaging portion is configured to be engageable with the hook, and
the mounting portion of a second link portion of each pair of link portions includes the bearing portion and the hook engaging portion.

2. The device for guiding a long object according to claim 1,
each mounting portion includes a first engaging portion, and
each mounting member includes a second engaging portion configured to be engageable with the first engaging portion on the first axis when the hook is engaged with the hook engaging portion in a state in which the hinge shaft is supported by the bearing portion.

3. The device for guiding a long object according to claim 1, wherein each mounting portion includes a restricting portion configured to restrict the hinge shaft from moving along the first axis when the mounting member is rotated with the hinge shaft supported by the bearing portion.

4. The device for guiding a long object according to claim 1, wherein each hook is configured to engage with the associated hook engaging portion from an inner side of the associated link toward an outer side of the link.

5. The device for guiding a long object according to claim 1, wherein
each mounting member includes a cutout portion at each of both ends, and
each mounting portion includes a notch engaging portion configured to be engageable with the cutout portion.

* * * * *